(12) United States Patent
Arends

(10) Patent No.: US 9,079,471 B1
(45) Date of Patent: Jul. 14, 2015

(54) DYNAMIC VEHICLE SUSPENSION FOR A RADIO-CONTROLLED VEHICLE

(71) Applicant: Horizon Hobby, LLC, Champaign, IL (US)

(72) Inventor: Gregory E. Arends, Mahomet, IL (US)

(73) Assignee: Horizon Hobby, LLC, Champaign, IL (US)

( * ) Notice: Subject to any disclaimer, the term of this patent is extended or adjusted under 35 U.S.C. 154(b) by 0 days.

(21) Appl. No.: 14/255,339

(22) Filed: Apr. 17, 2014

(51) Int. Cl.
*B60G 17/018* (2006.01)
*B60G 17/08* (2006.01)
*G05D 1/00* (2006.01)

(52) U.S. Cl.
CPC ............... *B60G 17/08* (2013.01); *G05D 1/0011* (2013.01); *B60G 2202/24* (2013.01)

(58) Field of Classification Search
USPC ....................................................... 701/2, 37
See application file for complete search history.

(56) References Cited

U.S. PATENT DOCUMENTS

| | | | | |
|---|---|---|---|---|
| 5,522,484 A * | 6/1996 | Sawai | ......................... | 188/282.2 |
| 5,842,688 A * | 12/1998 | Dore et al. | ................ | 267/140.14 |
| 7,699,146 B1 * | 4/2010 | Becker et al. | .................. | 188/275 |
| 8,820,495 B2 * | 9/2014 | King | .......................... | 188/282.5 |
| 2009/0277736 A1 * | 11/2009 | McAndrews et al. | ......... | 188/314 |
| 2012/0001399 A1 * | 1/2012 | Coombs et al. | ........ | 280/124.161 |
| 2014/0262655 A1 * | 9/2014 | Tuts et al. | ................. | 188/322.15 |

* cited by examiner

*Primary Examiner* — Hussein A. Elchanti
(74) *Attorney, Agent, or Firm* — McDonnell Boehnen Hulbert & Berghoff LLP

(57) ABSTRACT

The disclosed dynamic suspension systems include (i) a fluid-filled suspension tube, (ii) a piston rod partially enclosed within the suspension tube, (iii) a first impedance plate coupled to the piston rod and comprising bypass apertures, (iv) a second impedance plate comprising bypass apertures and arranged relative to the first impedance plate to form overlap regions at each point where a portion of a bypass aperture of the first impedance plate overlaps a portion of a bypass aperture of the second impedance plate. In operation, the first or second impedance plates is movable to change a size or number of the overlap regions to adjust a fluid flow rate through the overlap regions to control the speed and/or acceleration of the piston rod as the piston rod moves through the fluid-filled suspension tube.

19 Claims, 7 Drawing Sheets

DYNAMIC VEHICLE SUSPENSION FOR A RADIO-CONTROLLED VEHICLE

FIELD

This disclosure generally related to dynamic suspension systems for a vehicle. More specifically, disclosed embodiments relate to a terrain adaptive suspension system that may allow a user to quickly and easily adapt the response and performance of a vehicle to different terrain requirements and methods of operating such dynamic suspension systems. Preferred embodiments are directed to Radio Controlled (RC) vehicles.

BACKGROUND

RC vehicles have been in operation for many years. In basic form, RC vehicles are battery or gasoline-powered model vehicles (e.g., cars, trucks, boats, airplanes) that can be controlled from a distance using a specialized radio frequency (RF) transmitter (or controller). For example, the RF transmitter may be used to control the speed, forward and backward movement, and steering of the RC vehicle.

SUMMARY

As an RC vehicle travels over various surfaces (e.g., asphalt, gravel, dirt, mud, grass) and terrains (e.g., smooth, bumpy, rocky), it may be desirable in some instances to alter the suspension system of the RC vehicle to improve the vehicle's performance and handling. One way to alter the suspension system of the RC vehicle is to equip the vehicle with a dynamic shock absorber system configured to adapt to changing terrains and surfaces. In operation, an RC vehicle equipped with such a dynamic shock absorber system may provide for a greatly enhanced user experience by improving handling and responsiveness of the RC vehicle.

Disclosed herein are methods for dynamically controlling the suspension system of an RC vehicle. Some embodiments include determining at least one of a speed or acceleration of a piston rod of a dynamic vehicle suspension system as the piston rod moves through fluid in a suspension tube. In operation, the piston rod is disposed within the suspension tube and configured with a top portion that extends through a top aperture of the suspension tube. In some embodiments, the dynamic vehicle suspension system includes a first impedance plate with a first plurality of bypass apertures and a second impedance plate with a second plurality of bypass apertures. In these and other embodiments, the first impedance plate is positioned on top of (or perhaps below) the second impedance plate at a distal end of the piston rod from the top portion such one or more bypass apertures (or portions thereof) of the first impedance plate at least partially overlap with one or more bypass apertures (or portions thereof) of second impedance plate so that fluid can flow through at least a portion of the first and second plurality of bypass apertures.

Some embodiments may also include, based on the determined speed or acceleration of the piston rod as the rod moves through fluid in the suspension tube, rotating or otherwise adjusting the first impedance plate relative to the second impedance place, thereby varying the extent to which the bypass portions of the first impedance plate overlap with the bypass portions of the second impedance plate. Varying the degree of overlap (i.e., by increasing or decreasing the extent of the overlap, or by causing more bypass apertures of the first impedance plate to overlap with more bypass apertures of the second impedance plate), changes the rate at which fluid in the suspension tube flows through the bypass apertures. And changing the rate at which the fluid in the suspension tube flows through the bypass apertures of the first and second impedance plates changes the speed and/or acceleration of the piston rod as the rod moves through the fluid in the suspension tube, thereby making the suspension "stiffer" by reducing the flow rate or "looser" by increasing the flow rate.

RC vehicles equipped with a dynamic suspension system are also disclosed herein. In some embodiments, the dynamic suspension system includes (i) a suspension tube including a top aperture; (ii) a piston rod disposed within the suspension tube and configured with a top portion that extends through the top aperture; (iii) a first impedance plate that includes a first plurality of bypass apertures; and (iv) a second impedance plate that includes a second plurality of bypass apertures. In these and other embodiments, the first impedance plate is positioned on top of (or perhaps below) the second impedance plate at a distal end of the piston rod from the top portion of the piston rod. Also, the first impedance plate is aligned with the second impedance plate to allow fluid to flow through one or more bypass apertures of the first impedance plate and one or more bypass apertures of the second impedance plate at a first fluid flow rate. In operation, the first impedance plate is configured to move or adjust in relation to the second impedance plate to change or alter the alignment of the bypass apertures of the first and second impedance plates (by increasing or decreasing the degree to which the bypass apertures of the first impedance plate overlap with the bypass apertures of the second impedance plate), thereby causing the fluid to flow through the respective bypass apertures of the first and second impedance plates at a second fluid flow rate that is different than the first fluid flow rate.

Some embodiments of the RC vehicle equipped with the dynamic suspension system may also include a processor configured to determine at least one of a speed or acceleration of the piston rod as it moves through fluid in the suspension tube. Based on the determined speed or acceleration of the piston rod, the processor may cause (via signaling to a servo or other suitable actuation mechanism) the first impedance plate to rotate or otherwise move relative to the second impedance plate to adjust the degree to which the bypass apertures of the first and second impedance plates overlap (and/or increase or decrease the number of bypass apertures of the first impedance plate that overlap with bypass apertures of the second impedance plate), thereby controlling flow rate through the bypass apertures of the first and second impedance plates. In particular, reducing the degree to which the first and second bypass apertures overlap reduces the fluid flow rate, while increasing the degree to which the first and second bypass apertures overlap increases the fluid flow rate. As mentioned above, changing the fluid flow rate through the bypass apertures of the first and second impedance plates changes the speed and/or acceleration of the piston rod as the rod moves through the fluid in the suspension tube, thereby making the suspension "stiffer" by reducing the flow rate or "looser" by increasing the flow rate.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
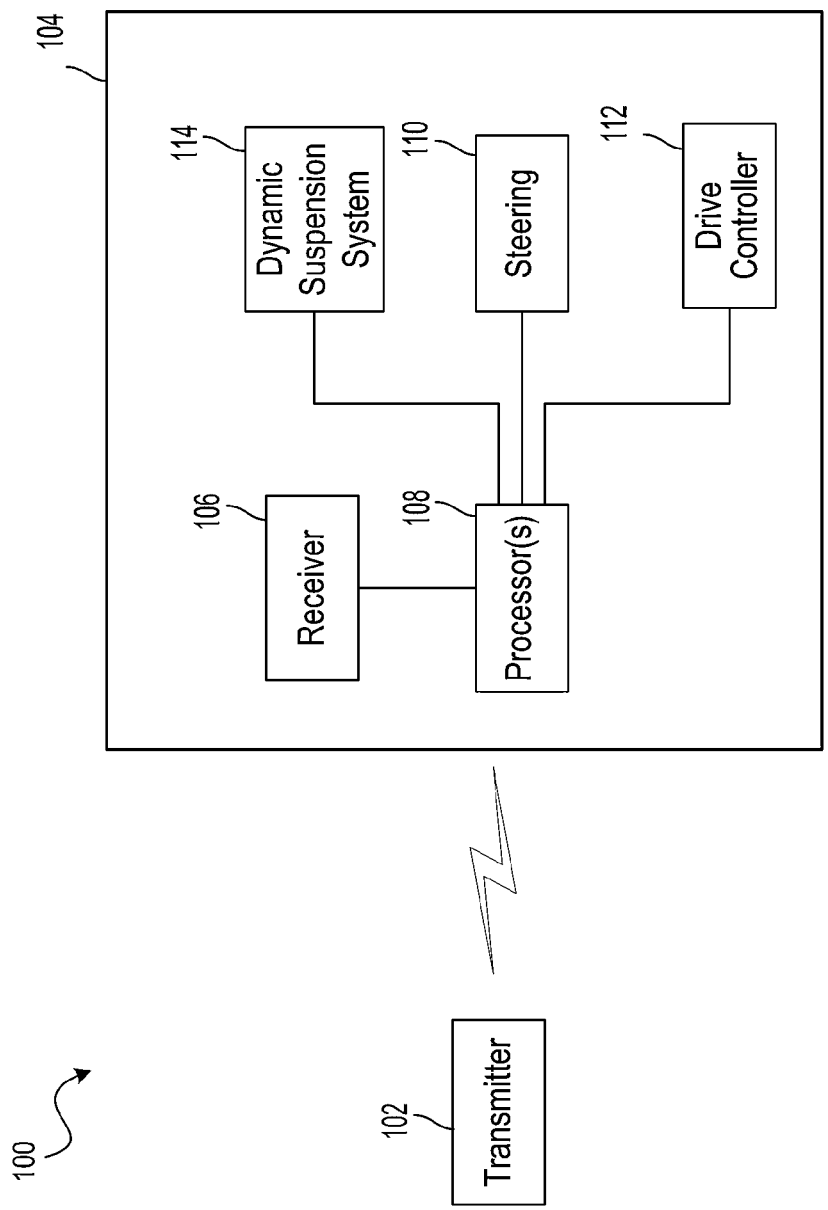
FIG. 1 illustrates a simplified block diagram of a radio-controlled (RC) vehicle system, according to an example embodiment.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

When a radio controlled (RC) vehicle is driven across different surfaces (e.g., asphalt, gravel, dirt, mud, grass and water) and/or varying terrain (e.g., smooth, bumpy, rocky or pitted) the RC vehicle may experience varying performance and responsiveness. For instance, when an RC vehicle is driving on a terrain with large variations (e.g., holes, pits), the forces applied to the RC vehicle as it drives over the holes and pits may destabilize the vehicle and cause it to overturn or crash. Alternatively, the forces applied to the RC vehicle may require the operator to reduce the speed of the RC vehicle to avoid overturning or crashing. One way to mitigate performance inconsistencies and improve vehicle responsiveness and controllability over varied surfaces and terrains is to equip the RC vehicle with a dynamic suspension system that is able to adapt to changing surfaces and terrains. Generally, some RC vehicle suspension systems enable the RC vehicle user to remove shocks from the RC vehicle and change various components of the suspension system to change responsiveness (damping) of the suspension system. Such components may include the shock spring, the shock oil, and shock disc configuration, each of which may affect one or more of ride height and the speed of compression and recovery of the shock in response to impacts.

However, changing components of the suspension system—and thereby changing the damping characteristics of the system—may require a certain level of knowledge, skill, and operational ability (e.g., a user will need to have additional suspension components and the tools necessary to remove, configure, and re-install the suspension components on hand). Further, to change the suspension system, the operator must stop the vehicle, remove the body of the RC vehicle, and then remove the various parts of the suspension system. These steps may be time and cost intensive because of the time required to take apart and put together the RC vehicle and the suspension system and the cost of the many different component parts.

Dynamic suspension systems according to the disclosed embodiments may overcome some of the drawbacks of existing systems by dynamically adapting to changing surfaces and terrains. Example dynamic suspension systems according to some embodiments include (i) a suspension tube with a top aperture and (ii) a piston rod disposed within the suspension tube and configured with a top portion that extends through the top aperture of the suspension tube; (iii) a first impedance plate including a first plurality of bypass apertures; and (iv) a second impedance plate including a second plurality of bypass apertures. In some embodiments, the first impedance plate is positioned on top of (or perhaps below) the second impedance plate at a distal end of the piston rod from the top portion of the piston rod. The first impedance plate is also aligned with the second impedance plate to allow fluid to flow through at least some the first plurality of bypass apertures (of the first impedance plate) and the second plurality of bypass apertures (of the second impedance plate) at a first fluid flow rate. In operation, the first impedance plate is configured to move in relation to the second impedance plate to change the degree of alignment (or misalignment) of one or more of the bypass apertures of the first and second impedance plates (i.e., change the extent of overlap between the first and second pluralities of bypass apertures), and thereby cause the fluid to flow through the respective first and second plurality of bypass apertures (of the first and second impedance plates, respectively) at a second fluid flow rate that is different than the first fluid flow rate.

Referring now to the figures, FIG. 1 illustrates a simplified block diagram of a radio-controlled (RC) vehicle system 100, according to some example embodiments. The RC vehicle system 100 includes (i) a transmitter 102 and (ii) a RC vehicle 104. The RC vehicle 104 includes one or more receivers 106, one or more processors 108, a steering system 110, a drive controller 112, and a dynamic suspension system 114.

Transmitter 102 is configured to transmit radio-control signals to RC vehicle 104 for controlling the RC vehicle 104. In operation, the RC vehicle operator uses the transmitter 102 to send commands, e.g., steering, throttle, braking, etc. to control the steering and speed of the RC vehicle 104.

Processor 108 is configured to receive the radio-control signals from the receiver 106. In some embodiments, the processor 108 and the receiver 106 may be integrated into a single unit. In operation, the processor 108 sends control signals to the steering system 110 (to control steering) and the drive controller 112 (to control throttle and braking) based on the radio-control signals received by the receiver 106 from the transmitter 102.

The RC vehicle 104 also includes a dynamic suspension system 114 configured to alter the performance of the RC vehicle's suspension system as the RC vehicle travels over various surfaces (e.g., asphalt, gravel, dirt, mud, grass) and terrains (e.g., smooth, bumpy, rocky). The dynamic suspension system may include one or more shock absorber systems alone or in combination with associated sensors and related circuitry, as described herein. In some embodiments, and in response to commands sent from the transmitter 102, the processor 108 may send commands to the dynamic suspension system 114 to adjust the performance of the RC vehicle's suspension system 114. In some embodiments, circuitry in the dynamic suspension system 114 (alone or combination with the processor 108) may additionally or alternatively monitor suspension performance (e.g., velocity and/or acceleration of piston rod movement in the suspension system) and adjust the performance of the RC vehicle's suspension system 114 in response to suspension performance exceeding certain thresholds, e.g., piston rod velocity and/or acceleration exceeding (or falling below) a threshold velocity and/or acceleration. For example, if the piston rod speed (and/or acceleration) is greater than or equal to an upper speed (and/or acceleration) threshold, the dynamic suspension system 114 may adjust the performance to reduce the speed (and/or acceleration) of the piston rod, resulting in a "stiffening" of the suspension performance. Similarly, if the piston rod speed (and/or acceleration) is less than or equal to a lower speed (and/or acceleration) threshold, the dynamic suspension system 114 may adjust the performance to increase the speed (and/or acceleration) of the piston rod, resulting in a "loosening" of the suspension performance.

Figure 2A:
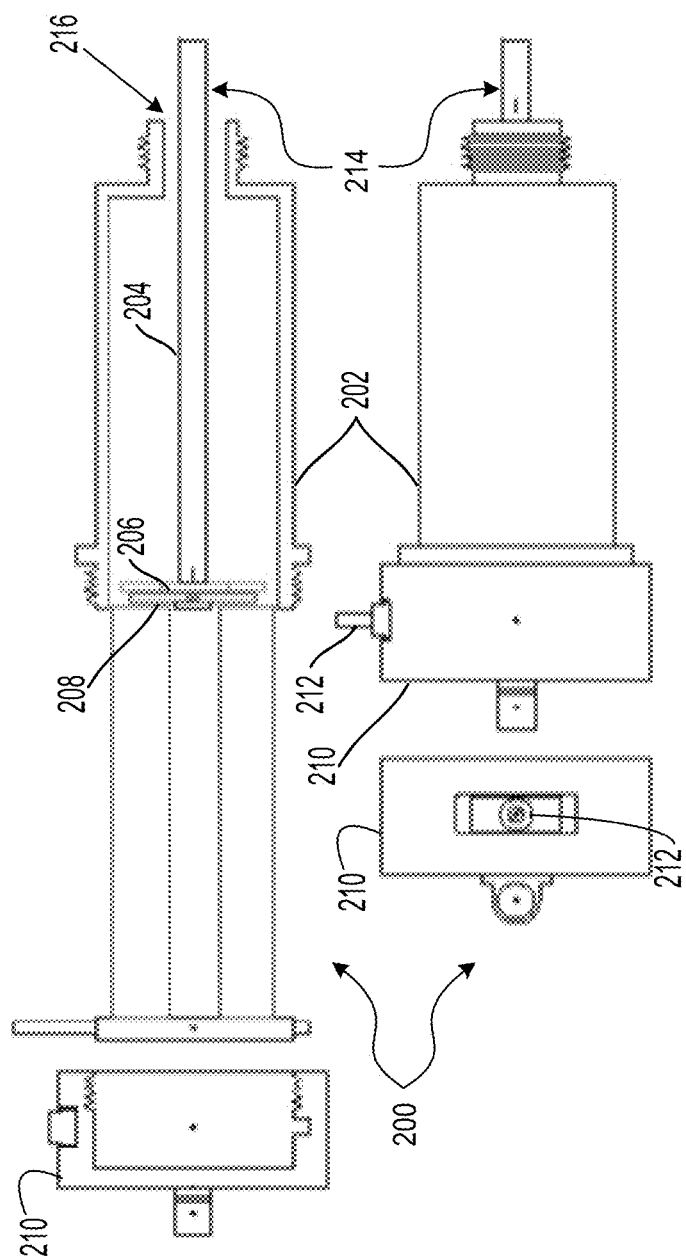
FIG. 2A illustrates an example shock system that may be included in a dynamic suspension system of a RC vehicle system such as the RC vehicle of FIG. 1, according to an example embodiment.

FIG. 2A illustrates two views of an example shock system 200 in a dynamic suspension system according to some embodiments. The shock system 200 includes a suspension tube 202, a piston rod 204, and two impedance plates (e.g., discs, semi-discs, ovals, squares, or similar structures) 206, 208. In operation, shock system 200 is implemented in an RC vehicle such as RC vehicle 104 and may be one component of the dynamic suspension system 114, as shown and described with reference to FIG. 1. In particular, the shock system 200 may, for example, be implemented in the RC vehicle 104 and connected to the suspension system of the RC vehicle 104 in a manner to adjust suspension movement associated with driving on varied terrain and surfaces.

In some embodiments, the dynamic suspension system may include multiple shock systems that are the same as or similar to shock system 200. For example, an RC vehicle may include one or more shock systems like shock system 200 for each wheel of the RC vehicle. In other embodiments, shock system 200 may be used on less than all wheels of the RC vehicle.

Suspension tube 202 may be formed from any material (e.g., polytetrafluoroethylene, other plastics, metals) that may be used to form a tube or other structure suitable to enclose fluid (e.g., hydraulic oil) when in an enclosed state, as is shown in the bottom portion of FIG. 2A. Suspension tube 202 may be generally cylindrical in shape, although in other embodiments, the suspension tube 202 may take other forms and shapes.

Piston rod 204 is disposed within the suspension tube 202. Impedance plates 206 and 208 are securely attached to piston rod 204. In this manner, the piston rod 204 and impedance plates 206, 208 act as a damper disposed within the suspension tube 202. As shown, the piston rod 204 is configured with a top portion 214 that extends through a top aperture 216 of the suspension tube 202. Impedance plates 206, 208 are connected to a bottom portion of piston rod 204 and configured so that the bottom portion of the piston rod and the impedance plates 206, 208 act as a piston rod head.

Figure 2B:
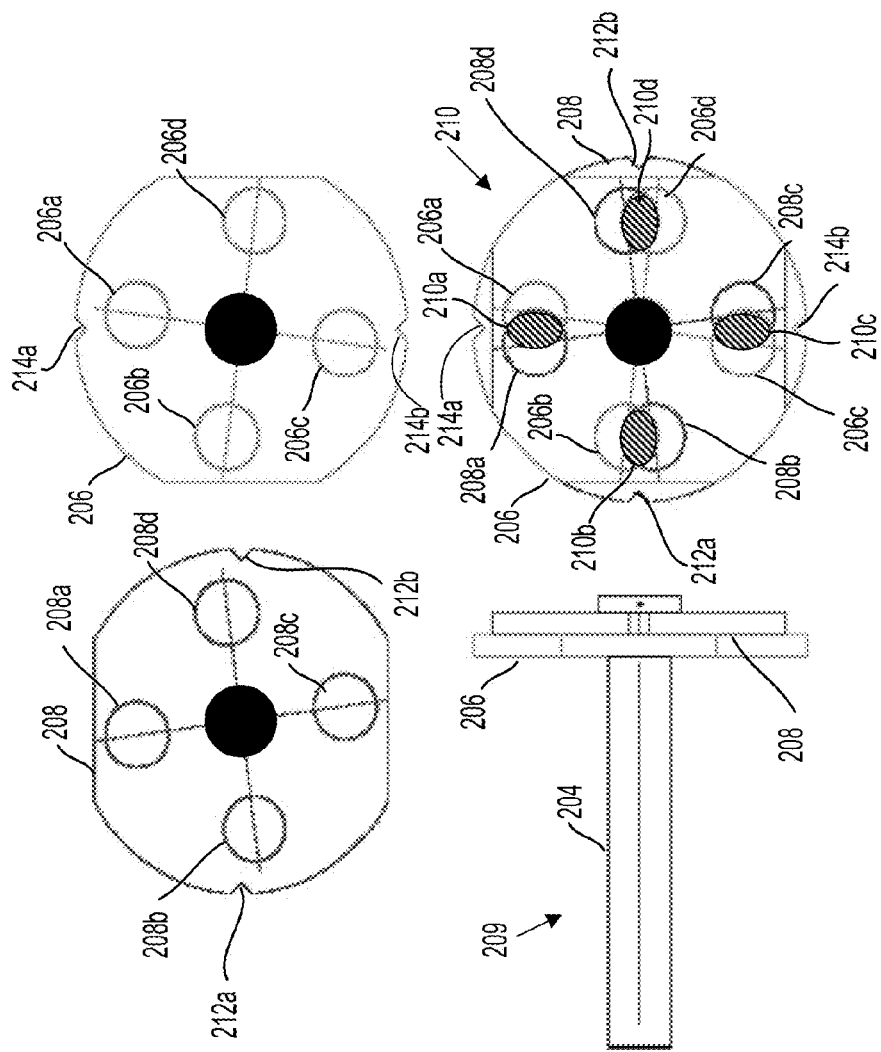
FIG. 2B illustrates example impedance plate configurations, according to an example embodiment.

FIG. 2B shows (i) lower impedance plate 206, (ii) upper impedance plate 208, (iii) a side view 209 of upper and lower impedance plates 206 and 208 affixed to piston rod 204, where the bottom portion of the piston rod 204 and the upper and lower impedance plates 206 and 208 form a piston rod head, and (iv) an overhead view 210 of upper impedance plate 208 positioned on top of lower impedance plate 206.

As shown, upper and lower impedance plates 206 and 208 may be circular or at least semi-circular in shape and may each include a plurality of bypass apertures in each impedance plate. For example, lower impedance plate 206 includes bypass apertures 206a-d and upper impedance plate 208 includes bypass apertures 208a-d. Although the example in FIG. 2B shows substantially round impedance plates with four substantially round bypass apertures, other embodiments may include different shaped impedance places with more or fewer apertures of different shapes and/or arrangements. For example, the impedance plates and/or bypass apertures in FIG. 2A may be octagonal, rectangular, oval, or other shape suitable through which fluid can flow.

In operation, lower impedance plate 206 and upper impedance plate 208 may be arranged relative to each other so that at least a portion of the bypass apertures 206a-d of lower impedance plate 206 (and/or at least a portion thereof) and at least a portion of bypass apertures 208a-d of upper impedance plate 208 (and/or at least a portion thereof) allow fluid to flow through the bypass apertures in both directions. For example, overhead view 210 of FIG. 2B shows lower and upper impedance plates 206 and 208 aligned such that the bypass apertures 206a-d of lower impedance plate 206 and the bypass apertures 208a-d of upper impedance plate 208 are positioned so that fluid can flow through the shaded overlap regions 210a-d (shown with the striped pattern for illustration purposes) where bypass apertures 206a-d overlap with bypass apertures 208a-d. Rotating (or otherwise adjusting) lower impedance plate 206 relative to 208 (or vice versa) increases or decreases the overlap regions 210a-d, thereby controlling the fluid flow rate through the bypass apertures 206a-d and 208a-d. For example, rotating or otherwise positioning one or both impedance plates 206 and 208 so that bypass apertures 206a-d overlap 100% (or at least substantially 100%) with bypass apertures 208a-d maximizes the size of the overlap regions 210a-d, thereby maximizing fluid flow through the bypass apertures 206a-d and 208a-d of the lower and upper impedance plates 206 and 208. Similarly, rotating or otherwise positioning impedance plates 206 and 208 so that substantially 50% of each bypass aperture 206a-d of lower impedance plate 206 overlaps with substantially 50% of each corresponding bypass aperture 206a-d of upper impedance plate 208 reduces each overlap region 210a-d by substantially 50% (as compared to the example where the bypass apertures 206a-d overlap 100% with bypass apertures 208a-d), thereby reducing fluid flow through the bypass apertures of lower and upper impedance plates 206 and 208.

Rotation, alignment, and/or adjustment of the impedance plates may be controlled via a sleeve lining in the inner diameter of the suspension tube 202 (FIG. 2A). An example of such a sleeve is shown as 216 in FIG. 2C. Sleeve 216 includes protrusions 218 that engage corresponding indentations or nooks 212a-b or 214a-b (shown in FIG. 2B), in at least one of the upper or lower impedance plates 208, 206. For example, in one configuration, the protrusions 218 of the sleeve 216 may engage the notches 214a-b of impedance plate 206 (FIG. 2B) but not engage notches 212a-b of impedance plate 208 (FIG. 2B). In an alternative configuration, the protrusions 218 of the sleeve 216 may engage notches 212a-b of impedance plate 208 but not engage notches 214a-b of impedance plate 206.

The impedance plate whose notches are not engaged by protrusions 218 of sleeve 216 (i.e., the impedance plate that is not engaged by the protrusions 218) is held in place by one or more similar protrusions (not shown in FIG. 2C) that reside along the inside wall of the suspension tube 202 (FIG. 2A). To accommodate the protrusions on the inside wall of the suspension tube 202, the sleeve 216 has a cut away portion 220. Thus, the arrangement of the sleeve 216 within the suspension tube 202 enables one of the impedance plates (i.e., the one engaged by the protrusions 218 of the sleeve 216) to be rotated while the other impedance plate (i.e., the one engaged by the protrusions along the inside wall of the suspension tube 202) is held in place. In one particular example, the lower impedance plate 206 is held rotationally stationary by one or more projections positioned within the walls of the shock tube 202 (FIG. 2A) while the upper impedance plate 208 is rotated in relation to the lower impedance plate 206. Rotating the upper impedance plate 208 in relation to the lower impedance plate 206 causes the shaded overlap regions 210-a-d (FIG. 2B) to increase or decrease in size, thereby changing the "stiffness" or "looseness" of the shock.

Returning back to FIG. 2A, example shock system 200 also includes a tube cap 210 and a lever arm 212. Suspension tube cap 210 is affixed to a lower end (opposite upper end 214) of the suspension tube 202 and serves to seal the piston assembly within the suspension tube 202. In some embodiments the lever arm 212 may include a dowel pin inserted through a portion of the tube cap 210. The dowel pin may be configured to exit through a slot in the tube cap 210. Further, shock oil may be prevented from leaking out of the shock system 100 by the use of a rubber gasket surrounding the dowel pin 212.

The lever arm 212 is used to effectuate the rotation of the sleeve 216 and its corresponding protrusions 218. Because the protrusions 218 engage notches in one of the impedance plates (e.g., notches 212a-b in upper impedance plate 208 in the example noted above), rotating the sleeve 216 causes the engaged impedance plate to rotate.

The sleeve 216 may be rotated using lever arm 212 to substantially any point between a minimum and maximum rotational position. In the example shown in FIG. 2C, the minimum position may correspond to position A (top half of FIG. 2C) and the maximum position may correspond to position B (bottom half of FIG. 2C), or vice versa.

Figure 2C:
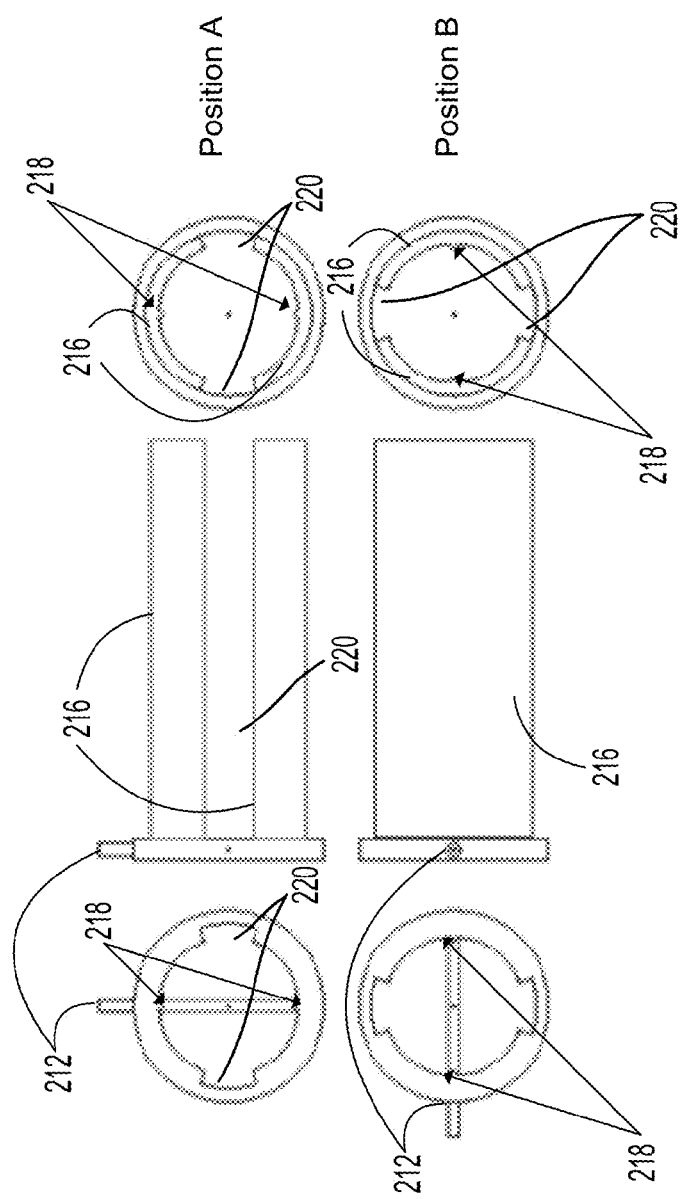
FIG. 2C illustrates a conceptual rotation of the impedance plates of FIG. 2B, according to an example embodiment.

At position A, the sleeve 216 engages the upper impedance plate 208 (FIGS. 2A and 2B) using protrusions 218, and protrusions from the wall of suspension tube 202 (FIG. 2A) engage the lower impedance plate 206 (FIGS. 2A and 2B) to hold lower impedance plate 206 in place. In FIG. 2C, the protrusions that protrude from the inside wall of the suspension tube 202 are not shown, but these protrusions would be located along the inside wall of the suspension tube 202 in cut away portion 220 of the sleeve 216 to allow the sleeve 216 to move within suspension tube 202.

Position B in FIG. 2C shows the sleeve 216 rotated 90 degrees relative to position A. In operation, the sleeve 216 may be rotated using lever arm 212. Once rotated to Position B, the alignment of bypass apertures 208a-d of upper impedance plate 208 (FIG. 2B) with the bypass apertures 206a-d of lower impedance plate 206 (FIG. 2B) is different than the alignment of the bypass apertures of the respective impedance plates when in Position A.

In operation, rotating the sleeve 216 via the lever arm 212 changes the alignment of the bypass apertures 208a-d of the upper impedance plate 208 relative to the bypass apertures 206a-d of the lower impedance plate 206, which increases (or decreases) the overlap regions 210a-d (FIG. 2B), thereby controlling the fluid flow rate through the bypass apertures 206a-d and 208a-d and the corresponding "stiffness" or "looseness" of the shock system.

FIG. 2C shows the minimum position (position A) and maximum position (position B) at 90 degrees relative to each other for illustration. However, positions A and B could be more or less than 90 degrees apart. Also, in practice, the sleeve 216 may be positioned in more than just positions A and B. For example, in some embodiments, the positions A and B may be 45 degrees apart, and the lever arm 212 can be used to rotate the sleeve 216 to any point between A and B in 1 degree increments or similar increments. The arrangement of the two positions (A and B) depends on the configuration of the sleeve 216, and the corresponding change in fluid flow through the bypass apertures of the upper and lower impedance plates depends on the arrangement of the bypass apertures on the upper and lower impedance plates.

Rotation of the lever arm 212 may be effectuated in various ways including, for example, (i) a user manually making adjustments by moving the lever arm 212; (ii) a user remotely adjusting the position of the lever arm 212 using the transmitter 102 (FIG. 1) or smart phone to actuate a servo drive system (or similar automated system) that adjusts the position of the lever arm 212; and (iii) a control system automatically determining and adjusting the position of the lever arm 212 based on thresholds established by the user, thresholds configured by the manufacturer of the vehicle (or shock system), or some combination thereof.

Figure 3A:
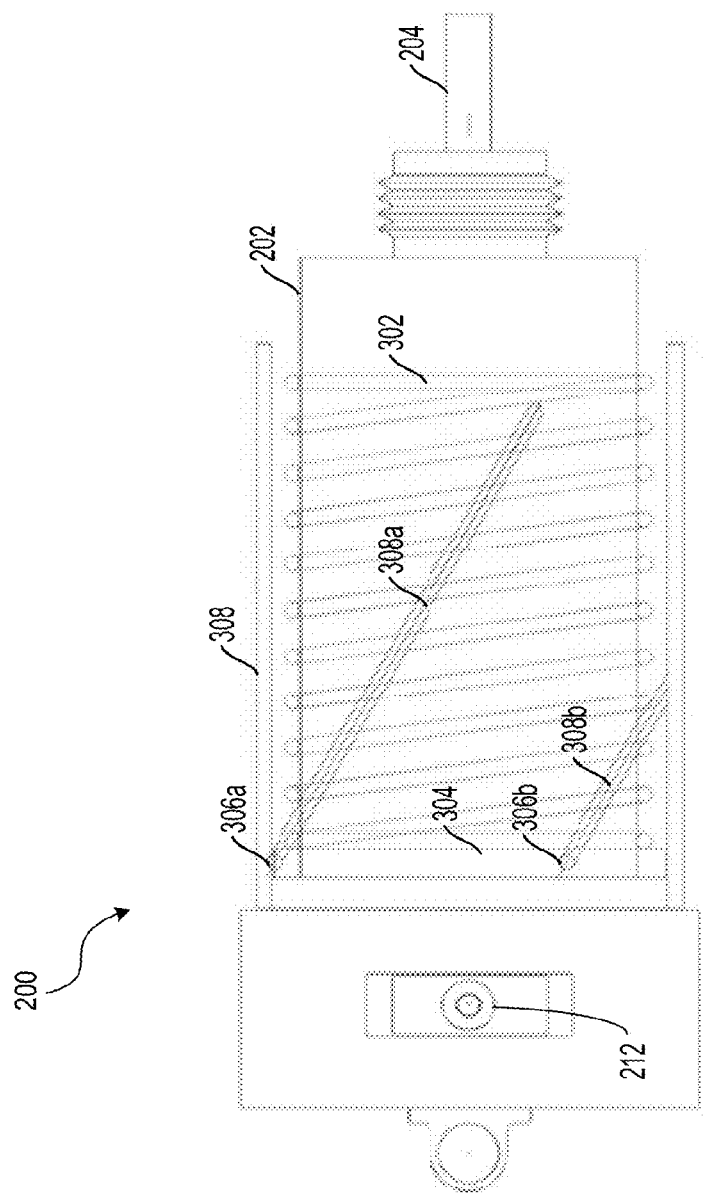
FIG. 3A illustrates another example shock system that may be included in a dynamic suspension system of a RC vehicle system such as the RC vehicle of FIG. 1, according to an example embodiment.

FIG. 3A illustrates further aspects of an example shock system 200 that may be included in a dynamic suspension system. For example, the components shown in FIG. 3A may be incorporated into shock system 200 in addition to one or more of the components described with reference to FIGS. 2A-2C. As shown in FIG. 3A, example shock system 200 includes a spring 302 and a spring positioning disc 304 that allows adjustment of the spring tension and height of the shock system 200. Adjusting the spring tension and height of the shock system may help further reduce undesirably high suspension movement that the RC vehicle may experience when driving over bumpy terrain.

In operation, the spring tension may be adjusted, for example, by moving spring positioning disc 304 along the outside of the suspension tube 202 to increase or reduce tension in the spring 202. In other words, the spring tension is controlled by pressure exerted from the spring positioning disc 304. The spring tension may be increased as the spring is compressed against, for example, a hard stop of the shock system 200 (not shown in FIG. 3A) by the spring positioning disc 304.

The inner diameter of the positioning disc 304 may be configured to allow the positioning disc 304 to move along the outer wall 202 of the suspension tube 202. In some embodiments, the outside perimeter of the positioning disc 304 includes two ball bearings 306a-b. Although the example in FIG. 3A illustrates two ball bearings, in other examples, a different number of bearings may be used depending at least in part on the size (and circumference) of the suspension tube 202.

In the embodiment shown in FIG. 3A, a positioning sleeve 308 substantially surrounds the spring 302. Positioning sleeve 308 includes grooves 308a, 308b that facilitate the movement of the positioning disc 304. The grooves 308a, 308b are positioned at 120 degree angles around the inside circumference of the sleeve 308. Positioning disc 304 is substantially enclosed within positioning sleeve 308 so that the ball bearings 306a-b ride in the grooves to facilitate movement of the positioning disc 304 inside the positioning sleeve 308 and along the suspension tube 202 between the positioning sleeve 308 and suspension tube 202. In operation, the ball bearings 306a-b allow the grooves 308a-b to hold the positioning disc 304 in one place or to move the positioning disc 304 up and down the length of the suspension tube 202 by turning the positioning sleeve 308. In operation, as the positioning sleeve 308 turns, the ball bearings 306a-b move forwards or backwards in the grooves 308a-b, thereby causing the positioning disc 304 to move along the outside of the suspension tube 202 accordingly. Additionally, the positioning sleeve 308 may function to protect the spring 302 from contamination by materials such as dust and dirt.

Figure 3B:
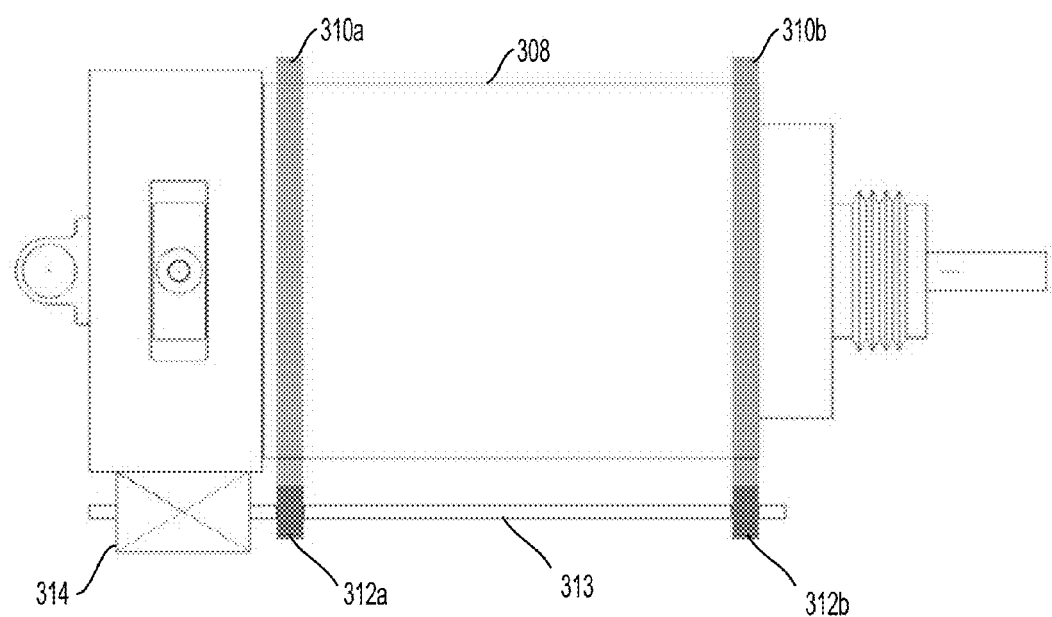
FIG. 3B illustrates an example spring tension control mechanism, according to an example embodiment.

Some embodiments may also include a gear system configured to rotate the positioning sleeve 308, and thereby move the positioning disc 304 along the suspension tube 202 to a desired position, and thereafter hold the positioning disc 304 in the desired position for at least some period of time. An example embodiment including such a gear system is shown in FIG. 3B. The example gear system shown in FIG. 3B includes gears 310a-b and 312a-b.

Gears 310a-b surround the outside circumference of the positioning sleeve 308. Motor 314 rotates shaft 313, which is connected to gears 312a-b. Gears 312a-b on shaft 313 interface with gears 310a-b, respectively. In operation, rotating the shaft 313 via the motor 314 causes gears 312a-b to rotate, which in turn causes gears 310a-b to rotate, thereby turning the positioning sleeve 308, which will thereby move the positioning disc 304 (FIG. 3A) up and down the length of the suspension tube 202 (based on the direction that motor 314 rotates). In some embodiments (not shown in FIG. 3B) it may only be necessary to use a single gear to drive the positioning sleeve 308. Other embodiments may use a different number of gears in different configurations to facilitate rotation of the positioning sleeve 308.

In some embodiments, a user may remotely activate the motor 314 to adjust the positioning sleeve 308 (and thereby adjust the positioning disc 304) to adjust the spring tension using a transmitter 102 (FIG. 1) or a smart phone application. In further examples, an electronic control system (as a component of the dynamic suspension system 114 (FIG. 1)) can monitor the shock system performance and activate the motor 314 to adjust the position of the spring positioning disc 304. For example, the electronic control system can measure the speed and/or velocity of the piston rod with one or more sensors, and adjust the position of the spring positioning disc 304 to "stiffen" or "loosen" the suspension accordingly.

Figure 4:
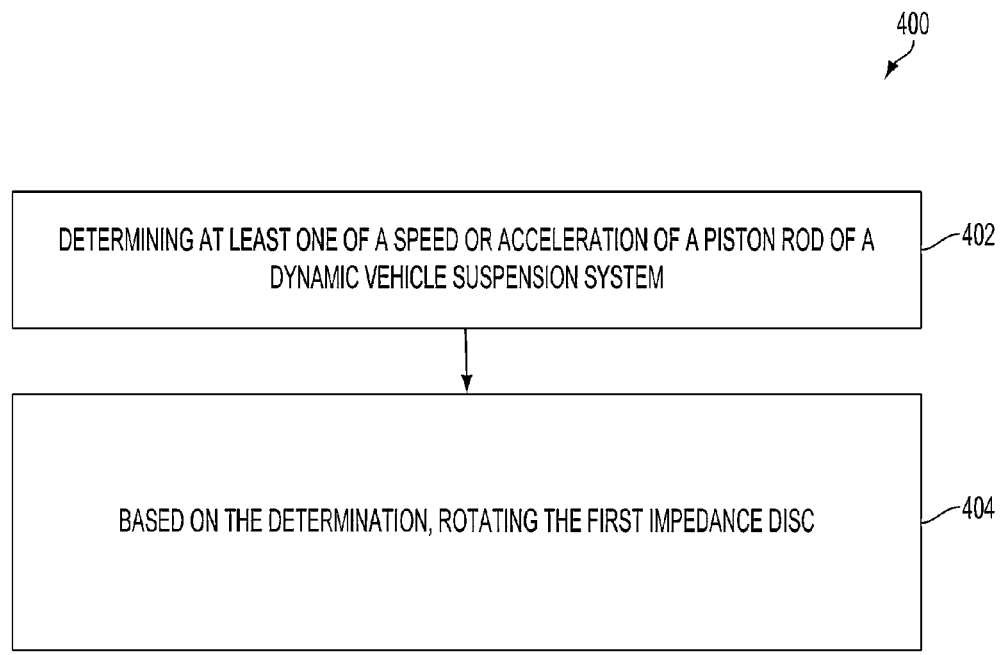
FIG. 4 illustrates a method that may be carried out by the RC vehicle of FIG. 1, according to an example embodiment.

FIG. 4 illustrates a method 400 that may be carried out by RC vehicle 104 (FIG. 1) equipped with a dynamic suspension system, such as the dynamic suspension system 114 comprising one or more shock systems 200 described in reference to FIGS. 1, 2A-C, and 3A-B. In some embodiments, method 400 is carried out by the dynamic suspension 114 alone or in combination with the processor(s) 108 (FIG. 1). However, it should be understood that method 400 might be carried out by other components or combinations of components within an RC vehicle without departing from the scope of the disclosure.

Method 400 begins at block 402, which includes determining at least one of a speed or an acceleration of a piston rod in a shock of a dynamic suspension system. The piston rod and the shock may be the same as or similar to piston rod 204 and shock 200 shown and described with reference to FIGS. 2A-C and 3A-B. In operation, one or more sensors and/or detectors can be used to measure the movement of the piston rod and/or determine the speed and/or acceleration of the piston rod as it moves in the shock tube.

In one example, the linear speed and/or acceleration of the piston rod 204 can be determined with one or more emitters (e.g., Light Emitting Diodes (LEDs)) and corresponding detectors (e.g., photodiodes) arranged around a portion of the piston rod, such as a portion of the top portion 214 of the piston rod 204 that extends through a top aperture 216 of the suspension tube 202 (FIG. 2A). To facilitate measurement of the speed and/or acceleration by the emitters and detectors, a portion of the piston rod may include a plurality of notches, holes, or other suitable structural elements that correspondingly block and allow light to pass from an emitter to its corresponding detector as the piston rod moves between the emitter(s) and detector(s). The time between measurements of the presence and absence of light by the detectors can be correlated with movement of the piston rod using methods known to those of skill in the art. In another example, linear speed and/or acceleration of the piston rod 204 can be determined with one or more accelerometers affixed to or otherwise incorporated within the piston rod 204. In yet another example, the linear speed and/or acceleration of the piston rod can be determined with a magnetometer arranged around a portion of the piston rod (e.g., a portion of the top portion 214 of the piston rod 204 that extends through a top aperture 216 of the suspension tube 202 (FIG. 2A)) configured with magnetic strips (or similar magnetic regions), where changes in a magnetic field measured by the magnetometer as the piston rod (and the magnetic regions) moves back and forth can be correlated with movement of the piston rod using methods known to those of skill in the art.

Based on the determination of the speed and/or acceleration, at block 404 method 400 includes rotating (or otherwise adjusting) the first impedance plate. The first impedance plate may be rotated in a manner similar to or the same as described herein with regard to FIGS. 1-3. The first impedance plate may be rotated or otherwise positioned to cause bypass apertures of the first impedance plate to overlap more (or less) with the bypass apertures of the second impedance plate, thereby allowing fluid within the shock tube to flow through the bypass apertures of the first and second impedance plates faster (or slower). For example, increasing the overlap between bypass apertures of the first and second impedance plates increases the fluid flow rate through the bypass apertures (thereby "loosening" the suspension) whereas decreasing the overlap between the bypass apertures of the first and second impedance plates reduces the fluid flow rate through the bypass apertures (thereby "stiffening" the suspension).

In some embodiments, if the speed and/or acceleration of the piston rod measured by the one or more sensors is determined to be faster than a configured threshold, then the first impedance plate can be rotated to reduce the overlap between the first and second bypass apertures (e.g., reduce the size of the overlap regions 210a-d shown in FIG. 2B) to reduce the fluid flow rate through the bypass apertures and thereby reduce the speed and/or acceleration of the piston rod through the shock tube to "stiffen" the shock system response. Similarly, if the speed and/or acceleration of the piston rod measured by the one or more sensors is slower than a configured threshold, then the first impedance plate may be rotated to increase the overlap between the first and second bypass apertures (e.g., increase the size of the overlap regions 210a-d shown in the FIG. 2B) to increase the fluid flow rate through the bypass apertures and thereby increase the speed and/or acceleration of the piston rod through the shock tube to "loosen" the shock system response.

While particular aspects and embodiments are disclosed herein, other aspects and embodiments will be apparent to those skilled in the art in view of the foregoing teaching. For example, while the embodiments are described with respect to applications for RC vehicles, the disclosed systems and methods are not so limited. The various aspects and embodiments disclosed herein are for illustration purposes only and are not intended to be limiting, with the true scope and spirit being indicated by the following claims.

I claim:

1. A dynamic vehicle suspension system comprising:
    a suspension tube filled with a fluid;
    a piston rod at least partially enclosed within the suspension tube;
    a first impedance plate coupled to a portion of the piston rod enclosed within the suspension tube, the first impedance plate comprising one or more bypass apertures;
    a second impedance plate comprising one or more bypass apertures and arranged relative to the first impedance plate within the suspension tube to form one or more overlap regions at each point where at least a portion of a bypass aperture of the first impedance plate overlaps at least a portion of a bypass aperture of the second impedance plate; and wherein at least one of the first or second impedance plates is movable to change at least one of a size or number of the one or more overlap regions, thereby adjusting a fluid flow rate through the one or more overlap regions to control a speed and/or acceleration of the piston rod as the piston rod moves through the fluid in the suspension tube.

2. The dynamic vehicle suspension system of claim 1, further comprising a lever arm configured to rotate at least one of the first or second impedance plates.

3. The dynamic vehicle suspension system of claim 1, further comprising an interior lining that is positioned inside the suspension tube, wherein the lining comprises first protruding engagement surfaces configured to engage and rotate the first impedance plate, and wherein the suspension tube comprises second protruding engagement surfaces configured to engage and hold steady the second impedance plate while the first impedance plate rotates.

4. The dynamic vehicle suspension system of claim 3, wherein the first impedance plate comprises first notches, and wherein the second impedance plate comprises second notches.

5. The dynamic vehicle suspension system of claim 1, wherein at least one of the first or second impedance plates is movable to change at least one of a size or number of the one or more overlap regions based on one or more calculations performed by one or more processors.

6. The dynamic vehicle suspension system of claim 2, further comprising a suspension tube cap coupled to an end of the suspension tube opposite the top aperture, wherein the lever arm comprises a dowel pin, and wherein the dowel pin exits the suspension tube via an opening in the suspension tube and the suspension tube cap.

7. The dynamic vehicle suspension system of claim 2, wherein the dowel pin is surrounded by a rubber gasket that substantially prevents the fluid from leaking out of the suspension tube.

8. The dynamic vehicle suspension system of claim 2, wherein the lever arm is configured for manual actuation.

9. The dynamic vehicle suspension system of claim 2, wherein the lever arm is configured to be actuated by a servomotor in response to one or more commands received from at least one of a radio transmitter or a smart phone.

10. The dynamic vehicle suspension system of claim 2, further comprising an electronic control system configured to operate the lever arm.

11. The dynamic vehicle suspension system of claim 1, wherein the first impedance plate is substantially circular, and wherein the second impedance plate is substantially circular.

12. The dynamic vehicle suspension system of claim 1, wherein the first plurality of bypass apertures are substantially similar to the second plurality of bypass apertures.

13. The dynamic vehicle suspension system of claim 1, further comprising:

a sensor configured to measure a speed of the piston rod as the piston rod moves within the suspension tube.

14. The dynamic vehicle suspension system of claim 13, wherein the sensor includes at least one of a magneto-resistive sensor, an accelerometer, or an optical sensor.

15. The dynamic vehicle suspension system of claim 1, further comprising:

a spring surrounding at least a portion of an outside of the suspension tube; and a positioning disc configured to compresses or decompress the spring to increase or decrease spring tension of the spring.

16. The dynamic vehicle suspension system of claim 15, wherein the spring is a coil spring, wherein a sleeve is positioned around at least a portion of the coil spring, wherein the sleeve comprises a plurality of grooves, and wherein the positioning disc includes a plurality of ball bearings configured to move within the plurality of grooves of the sleeve such that rotating the sleeve causes the positioning disc to compress or decompress the coil spring.

17. The dynamic vehicle suspension system of claim 16, further comprising:

a motor configured to rotate the sleeve via one or more gears.

18. A method comprising:

measuring at least one of a speed or acceleration of a piston rod of a suspension system as the piston rod moves through fluid in a suspension tube of the suspension system; and determining whether the measured speed and/or acceleration is greater than or equal to a first corresponding speed and/or acceleration threshold;

determining whether the measured speed and/or acceleration is less than or equal to a second corresponding speed and/or acceleration threshold;

in response to determining that the measured speed and/or acceleration is greater than or equal to the first corresponding speed and/or threshold, adjusting at least one impedance plate of the suspension system to give the suspension system a stiffer response than the suspension system had before adjusting the at least one impedance plate, wherein adjusting at least one impedance plate of the suspension system to give the suspension system a stiffer response than the suspension system had before adjusting the at least one impedance plate comprises reducing a number of or a size of one or more overlap regions between bypass apertures of first and second impedance plates by rotating the first impedance plate relative to the second impedance plate; and in response to determining that the measured speed and/or acceleration is less than or equal to the first corresponding speed and/or threshold, adjusting at least one impedance plate of the suspension system to give the suspension system a looser response than the suspension system had before adjusting the at least one impedance plate, wherein adjusting at least one impedance plate of the suspension system to give the suspension system a looser response than the suspension system had before adjusting the at least one impedance plate comprises increasing the number of or the size of one or more overlap regions between bypass apertures of the first and second impedance plates by rotating the first impedance plate relative to the second impedance plate.

19. A radio-controlled (RC) vehicle comprising:

one or more processors configured to control one or more aspects of a suspension system of the RC vehicle, wherein the suspension comprises four shock absorbers, each shock absorber comprising:

a suspension tube filled with a fluid;

a piston rod at least partially enclosed within the suspension tube;

a first impedance plate coupled to a portion of the piston rod enclosed within the suspension tube, the first impedance plate comprising one or more bypass apertures;

a second impedance plate comprising one or more bypass apertures and arranged relative to the first impedance plate within the suspension tube to form one or more overlap regions at each point where at least a portion of a bypass aperture of the first impedance plate overlaps at least a portion of a bypass aperture of the second impedance plate; and wherein at least one of the first or second impedance plates is movable to change at least one of a size or number of the one or more overlap regions based on one or more commands issued or calculations performed by the one or more processors, thereby adjusting a fluid flow rate through the one or more overlap regions to control a speed and/or acceleration of the piston rod as the piston rod moves through the fluid in the suspension tube.

* * * * *